United States Patent [19]
Licari

[11] Patent Number: 5,560,288
[45] Date of Patent: Oct. 1, 1996

[54] SINK BRIDGE

[76] Inventor: Yaffa Licari, 875 Ocean Ave., Elberon, N.J. 07740

[21] Appl. No.: 401,199
[22] Filed: Mar. 9, 1995
[51] Int. Cl.$^6$ .................................................. B23Q 3/00
[52] U.S. Cl. .......................................... 99/484; 269/289 R
[58] Field of Search .............................. 99/484; 248/346, 248/346.1, 133, 139; 134/92, 115 R; 269/289 R, 13, 302.1, 276

[56] References Cited

U.S. PATENT DOCUMENTS

| | | | |
|---|---|---|---|
| D. 254,529 | 3/1980 | Arnoff | D7/46 |
| D. 339,720 | 9/1993 | Kolada | D7/667 |
| 3,091,339 | 5/1963 | Marra et al. | 210/232 |
| 4,273,318 | 6/1981 | Crowhurst | 269/13 |
| 4,303,285 | 12/1981 | Wiegers | 312/211 |

Primary Examiner—David Scherbel
Assistant Examiner—Reginald L. Alexander
Attorney, Agent, or Firm—Morton Chirnomas

[57] ABSTRACT

The present invention relates to a chopping board for food preparation, wherein the chopping board comprises a substantially planar frame. The frame includes an upper frame surface and a lower frame surface. The upper surface includes a substantially planar chopping surface and bowl support means adjacent to the chopping surface for maintaining a food bowl or cooking pot in a substantially horizontal orientation adjacent to the chopping surface.

10 Claims, 11 Drawing Sheets

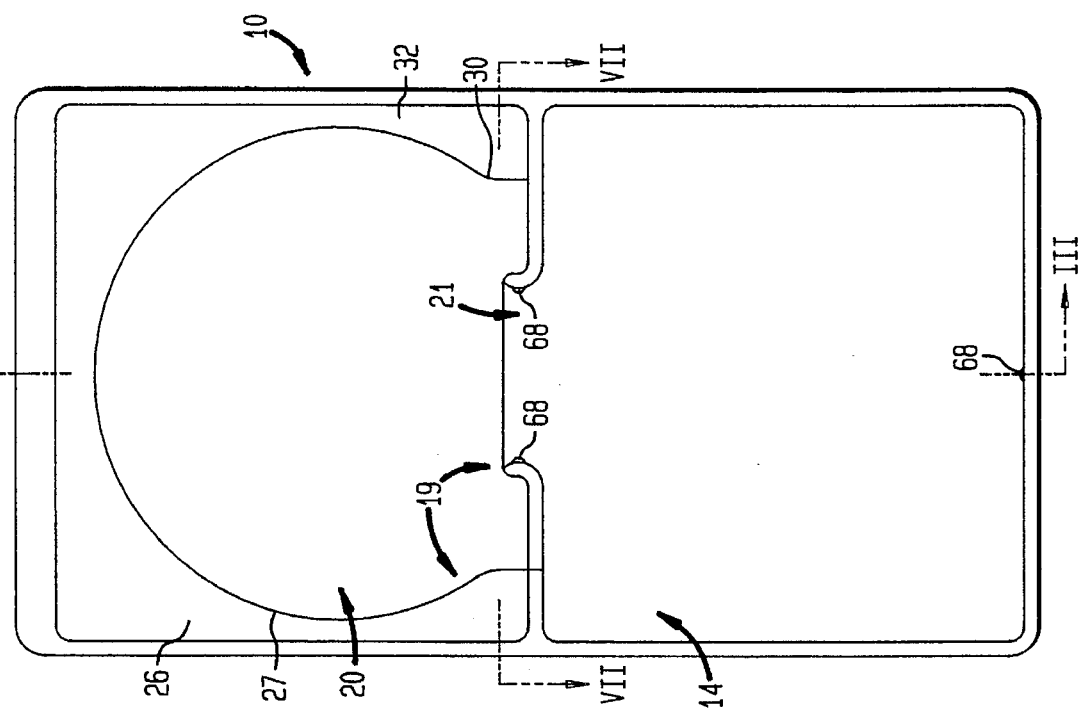
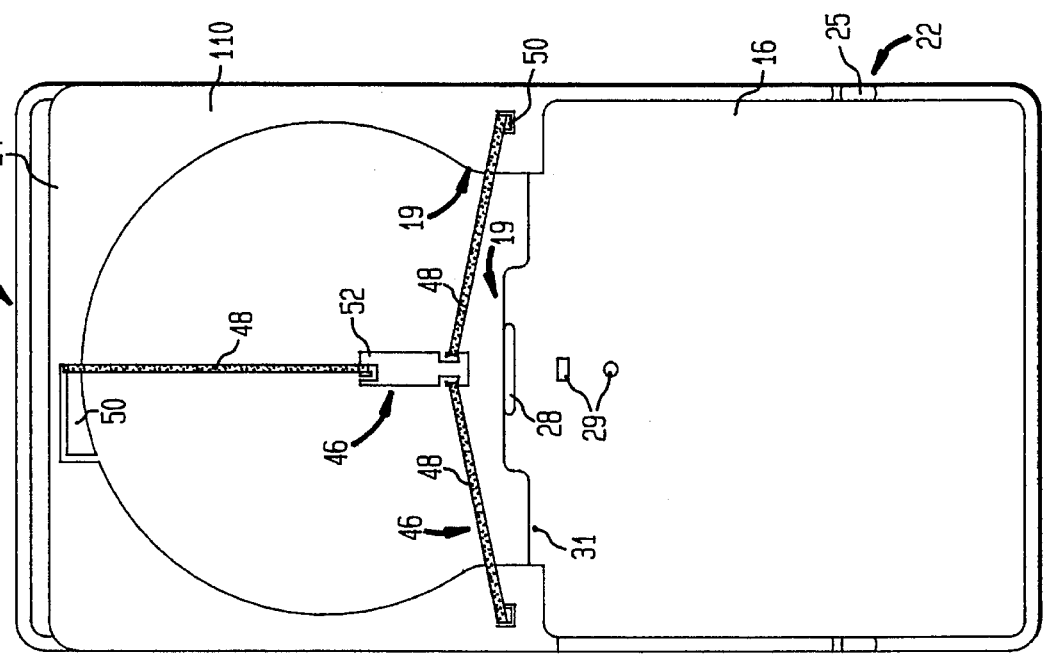

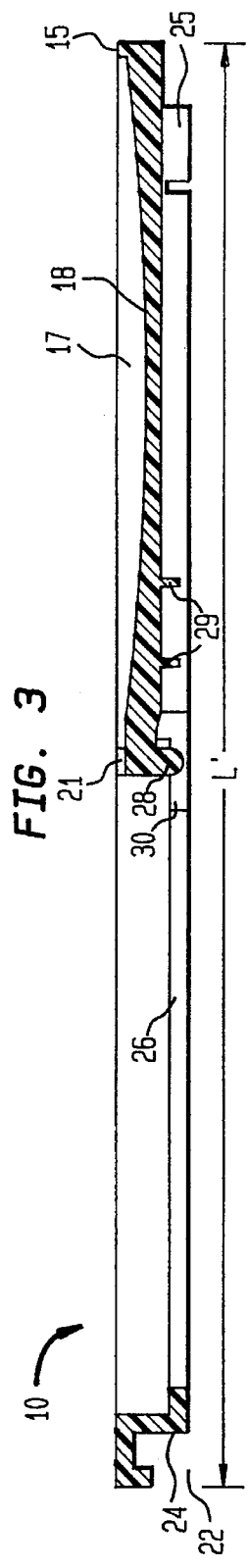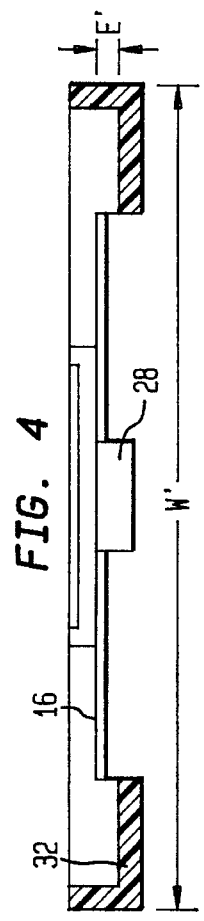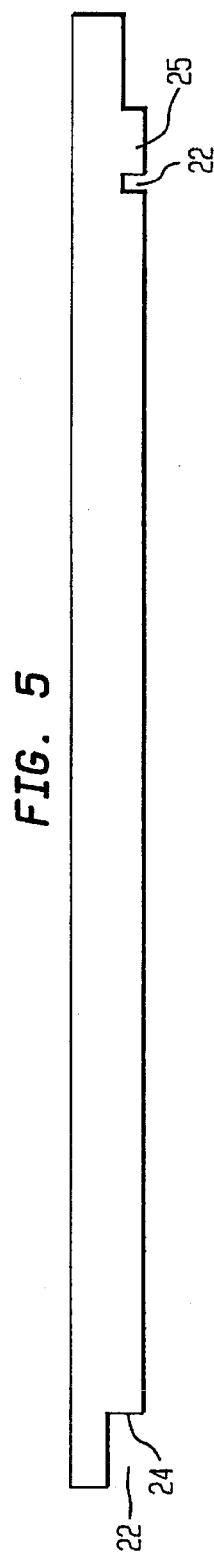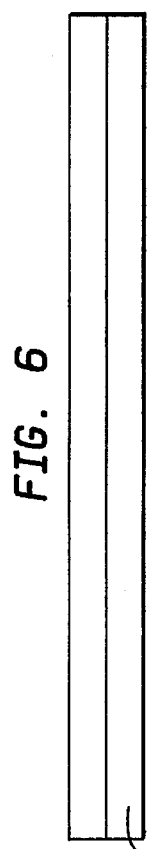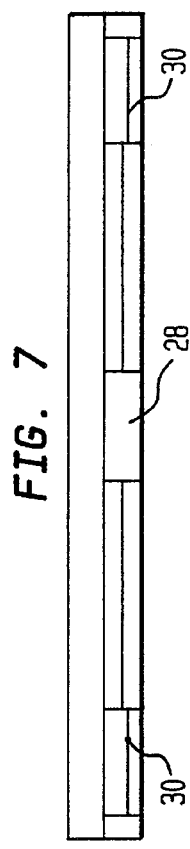

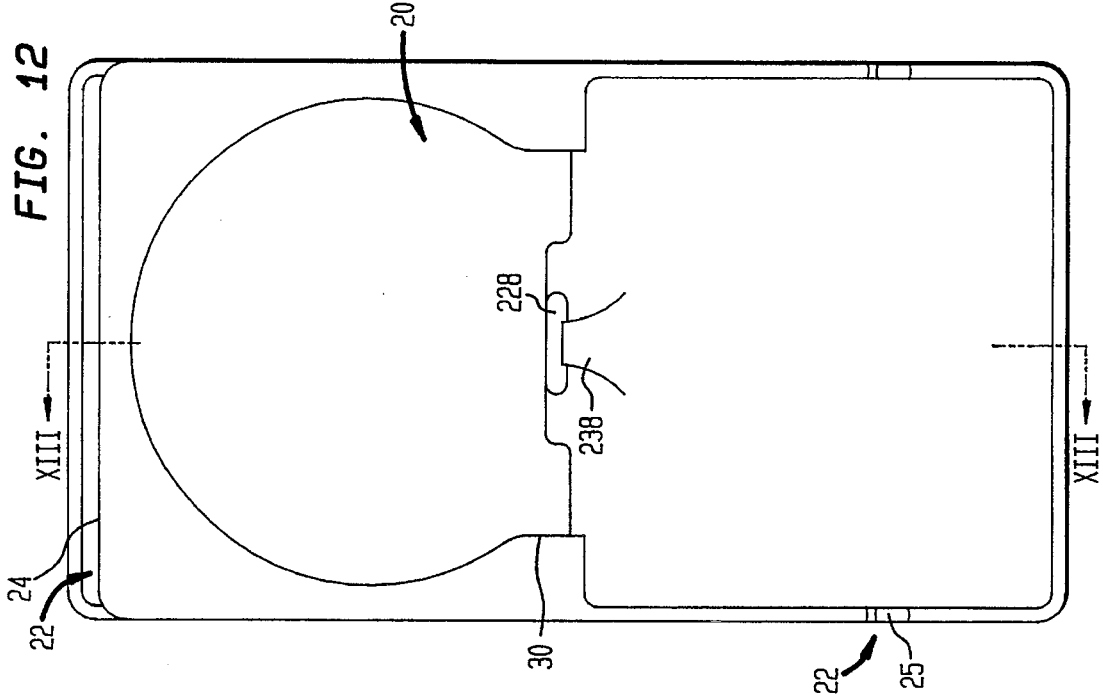
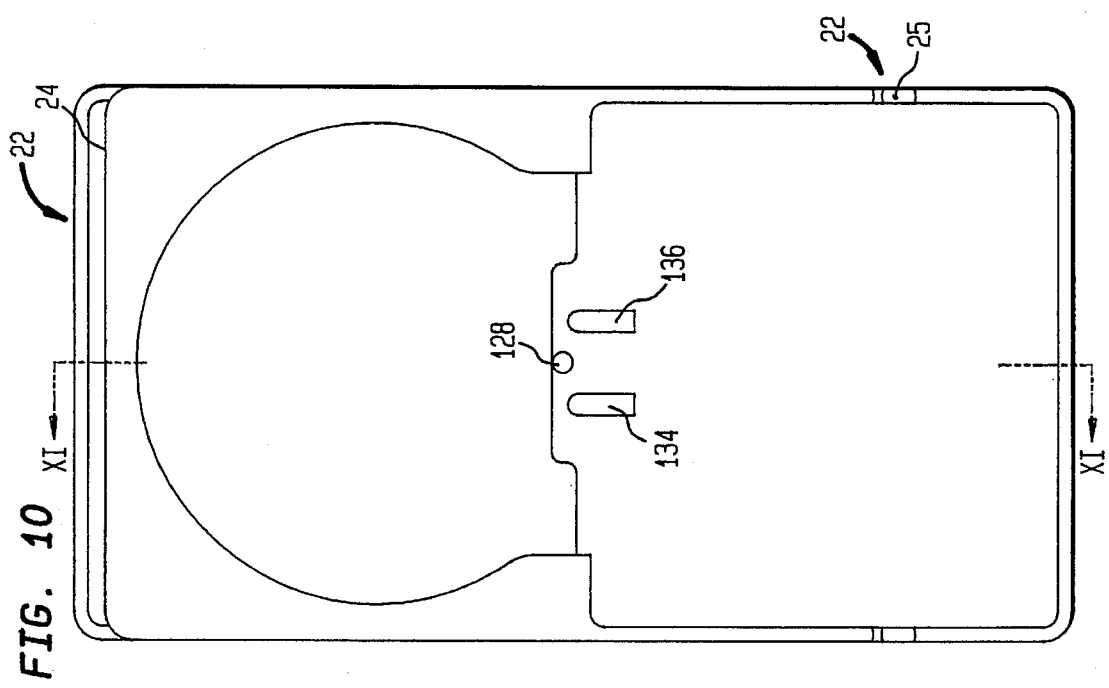

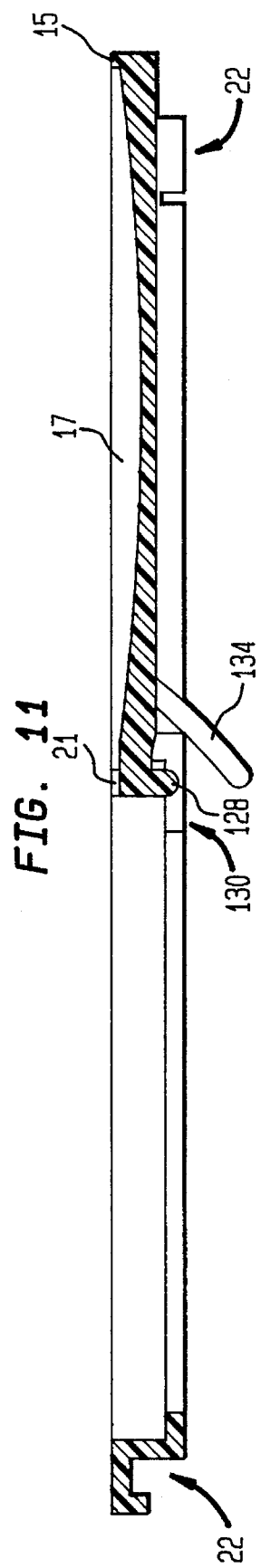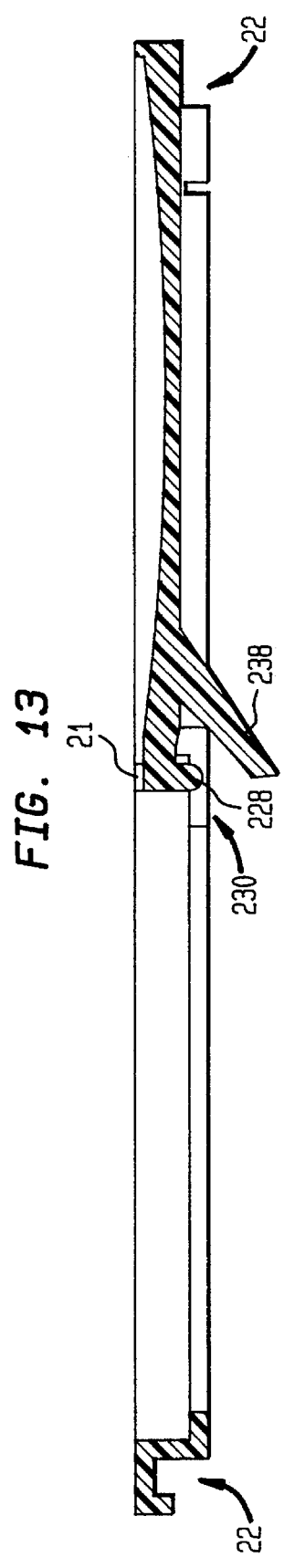

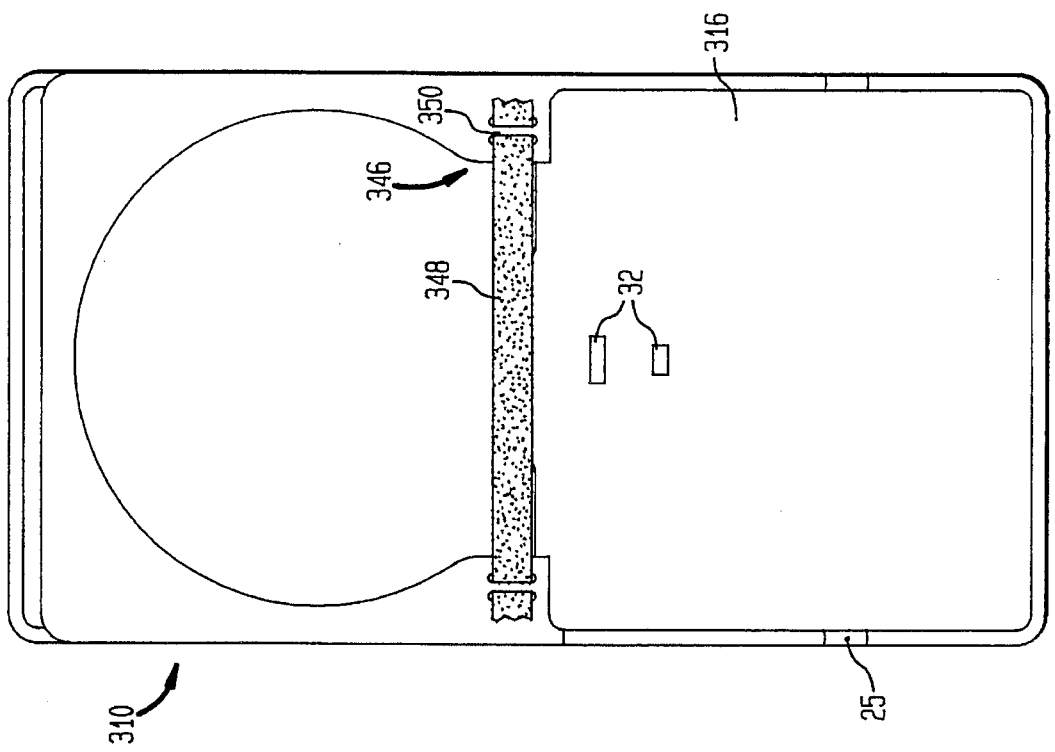
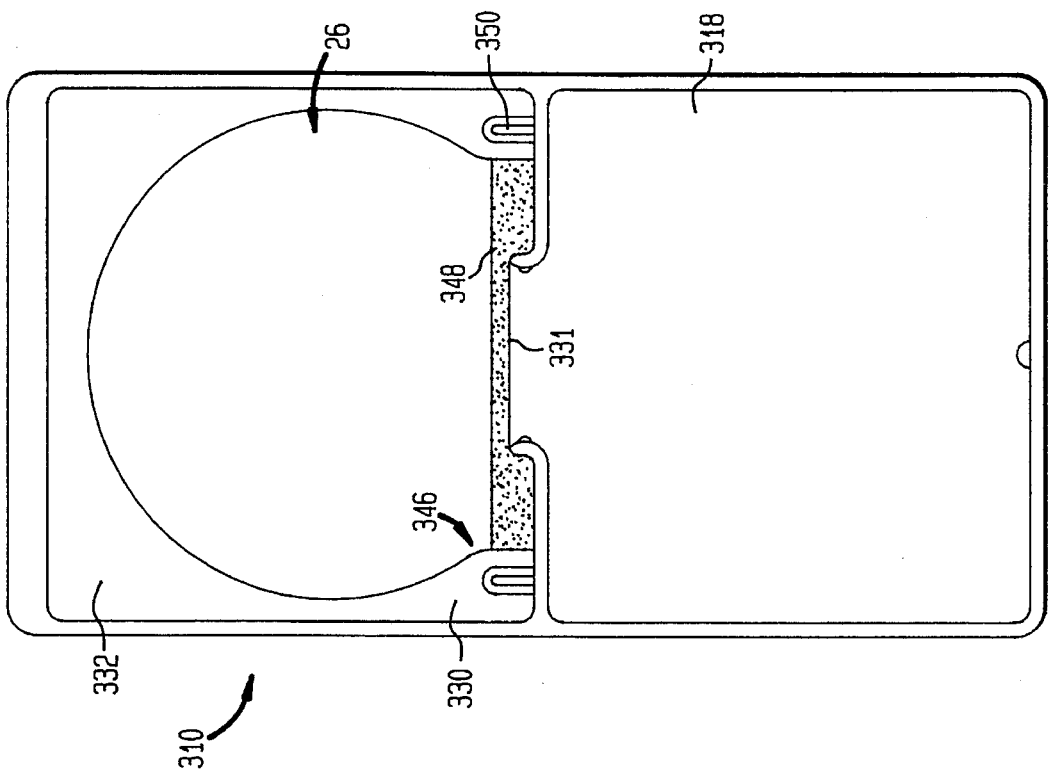

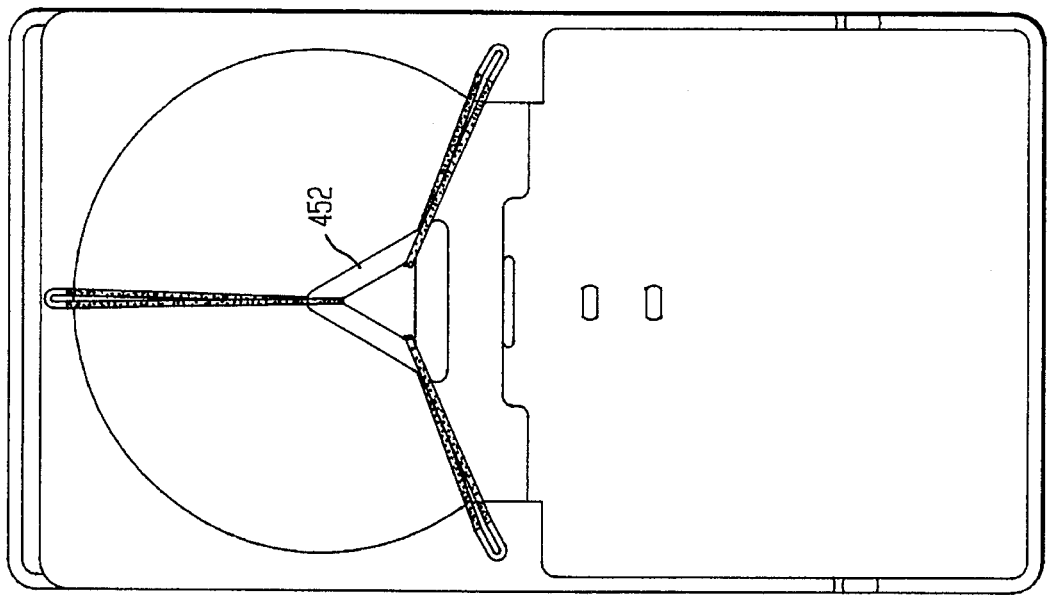
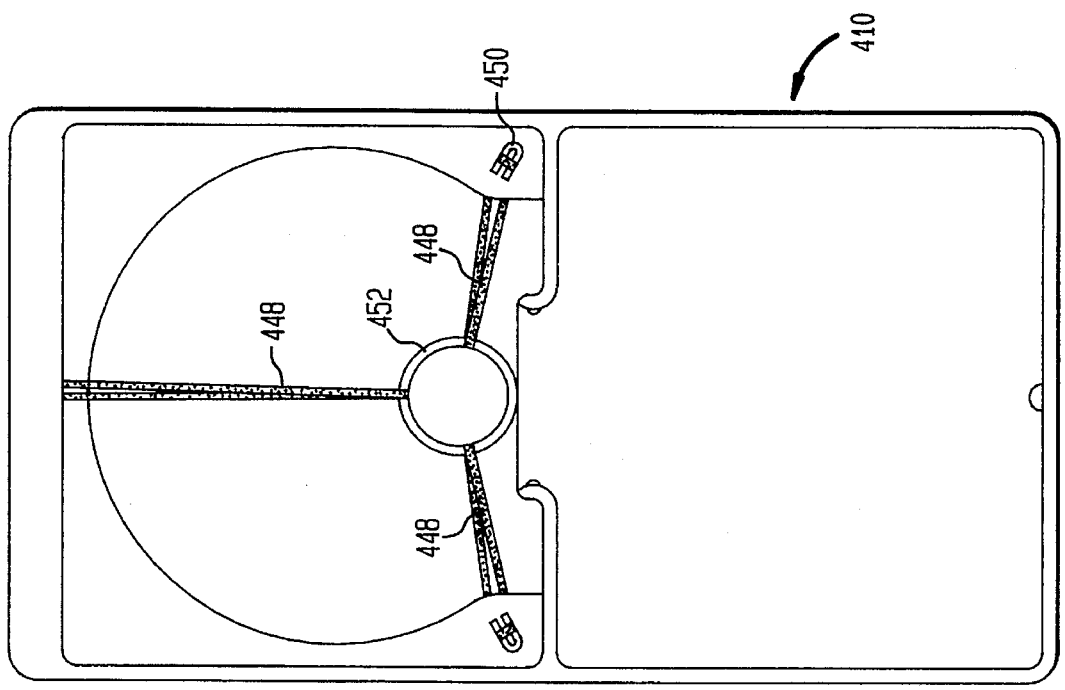

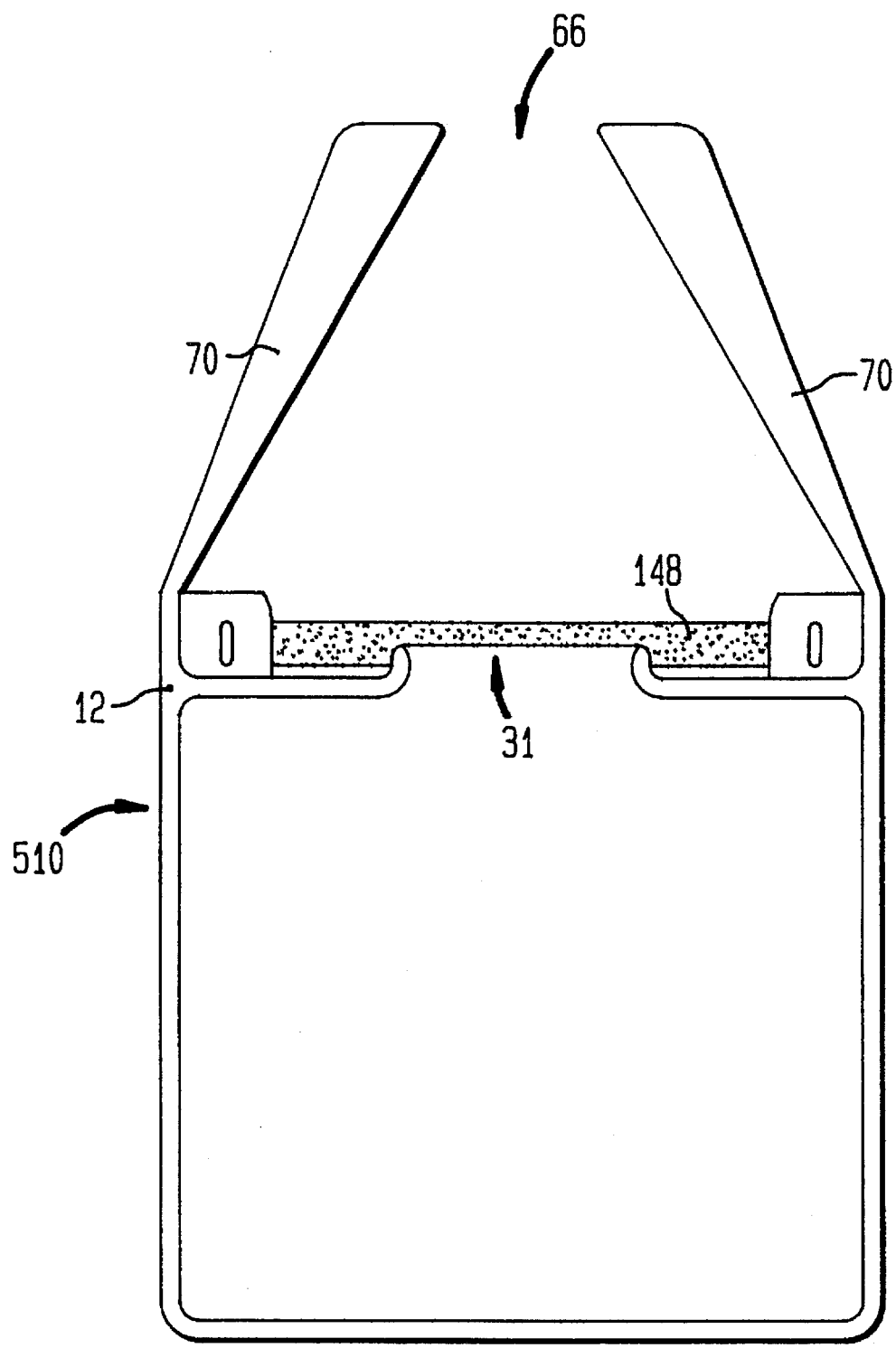

SINK BRIDGE

FIELD OF THE INVENTION

The present invention relates to food preparation surfaces in general. More particularly, the present invention relates to chopping boards adapted for use in a kitchen for chopping and cutting vegetables, meats, and other foodstuffs.

BACKGROUND OF THE INVENTION

The kitchen is often thought of as the most important piece of real estate in most homes. The square footage of counterspace is, for purposes of measuring the practical utility of a kitchen for food preparation, a fairly reliable measure of the desirability of a particular kitchen and homes may even be bought and sold depending on the amount and quality of counterspace in their kitchens. Therefore, as more and more countertop conveniences have been added to culinary arsenals, greater consideration has been given to ways to save this valuable commodity for the cook of the house. As evidenced by the relatively recent proliferation of appliances designed to be mounted under kitchen cabinets, appliances which hitherto occupied countertop space,, manufacturer's have become acutely aware that saving kitchen space can be a customer's overriding concern when considering the purchase of kitchenware, kitchen appliances or related tools.

Another consideration which has been recognized as having value to a customer of housewares of all sorts, and particularly in kitchenware, is that of a contrivance being operable in a manner which frees one or both of the user's hands for other tasks or otherwise increases the efficiency of the user in their task.

Consider the following typical hypothetical example of a cook using a conventional chopping board, usually constructed from a rigid piece of wood, acrylic plastic or nylon. In most cases, the board is a relatively heavy object, to prevent shattering from being hammered or chopped at with a knife or chopper. Additionally, consider that the board must be set on an even surface of some sort, most often a kitchen countertop or nearby tabletop. After the food is chopped, using a knife or other chopping or slicing tool, it must then be transferred to the pot or pan in which it will be further processed or into a bowl for serving. In the instance where a cook already has a pot or pan warming on a stove-top or in an oven, the cook must either transfer the food into an intermediary transport vessel for transport to the oven area, or physically lift the heavy board, carry it over to the stove area, properly position the pot, pan or open the oven door and while controlling the heavily laden board with one hand, carefully slide the chopped food into the pot or pan with the other hand, more often than not spilling some of the food onto the floor, under the stove burners or onto the oven floor. This highly inefficient and cumbersome procedure can be potentially exhausting and certainly creates more work. But it does not end there.

Still maintaining control of the now-dirty board or worse yet quickly scurrying to find a place to set it down, the cook must replace the pot or pan lid or replace the roasting pan into the oven and close the oven. Then the board must be transported back to sink, move aside any dishes and utensils with which the sink is already filled, and immediately clean the board, thereby reclaiming the countertop space which was occupied, finally, storing the board away in a cabinet.

The final step, that of cleaning, can never be underestimated with respect to any reusable food preparation utensil. Unfortunately, it is known that many cutting boards, almost no matter how vigorously scrubbed, often retain some food residues, especially when used frequently and once the surface is heavily scored. Their continued use can eventually cause food poisoning or other illnesses. This disadvantage is suffered by wood-surfaced cutting boards in particular, and in some small manner by nylon cutting boards. While glass or ceramic cutting boards do not suffer from this particular disadvantage, they have the additional problems of extreme weight and they have the potential of shattering when dropped or struck hard or, worse yet, of chipping and leaving sharp bits in the food being prepared. Additionally, repetitive cutting on glass cutting boards tends to accelerate dulling of the knife being used.

Although materials such as high density polyethylene, nylon and acrylic are less susceptible to the afore-mentioned disadvantages, nylon boards do become worn and stained, developing a most unappetizing appearance over a period of time, sometimes after as few as 100–200 uses. The cost of a board of average thickness (usually in the range of from ⅜ inches to ¾ inches) constructed from these materials to the consumer is often in the range of from $8–$15 retail, and they still suffer from the disadvantages previously mentioned.

One known cutting board attempts to address the issue of space and also provides means for drainage of liquids therefrom by providing a cutting board of wood which has extendible wire supports for maintaining the board in a suspended position above a sink. The board, rather than having a continuous surface, is provided with an area where a wire grid forms the surface of the board. In use, a cook cuts fish or some other food and shoves it temporarily onto the surface of the grid where it can drip or drain directly into the sink below. However, the size of this board is necessarily large, on the order of 12 to 18 inches in length, and the food must still be transferred to its final destination by one of above-described methods, i.e. piecemeal, by an intermediary bowl or by lifting the entire board off the sink and over to the other bowl or to the stove. The other disadvantages mentioned above are not even addressed by this known cutting board.

Another known board is provided with a hole through one portion thereof. The board is simply placed across a sink and food is chopped thereon and pushed through the hole to fall into a bowl or pot placed into the sink below, that is assuming the bowl or pot is positioned exactly underneath the hole. This cutting board simply transfers the space burden from the countertop to the sink bottom. Prior to its use, the cook must either empty the sink to provide space on which to rest the bowl or at least the sink's contents must be rearranged. However, this method introduces new health risks into food preparation since food is now more likely than before to come into contact with the unsanitary surfaces and contents of the sink.

SUMMARY AND OBJECTS OF THE INVENTION

Therefore it is one object of the present invention to provide a cutting board which saves countertop space.

It is another object of the present invention to provide a cutting board which considerably frees the hands of the food preparer when actually chopping the food.

It is a further object of the present invention to provide a cutting board which minimizes the manipulations necessary to move the food from the cutting board surface to its serving bowl or cooking pot It is yet another object of the present invention to provide a cutting board which reduces the likelihood of losing any portion of the food being prepared caused by its being relocated to another vessel, thereby reducing waste and unnecessary mess.

It is yet a further object of the present invention to provide a cutting board which allows economical replenishment of the cutting surface when it becomes so scored that it cannot be cleaned.

It is still another object of the present invention to provide a cutting board which has greater hygienic properties than known cutting boards.

The above advantages and others not specifically enumerated herein are provided by the cutting boards of the present invention. Generally speaking, the cutting boards of the present invention comprise a substantially planar frame having an upper frame surface and a lower frame surface. A cutting surface is provided on a portion of the upper frame surface which in one exemplary embodiment comprises a depressed, slightly concave receptacle formed in the upper frame surface for receiving a chopping board insert. The chopping board insert, which provides the cutting surface in this embodiment, and the insert receptacle have closely corresponding conformations such that the insert is received into the receptacle and is maintained in position. This can be achieved by providing the insert with a slightly greater width than that of the receptacle, such that some small amount of force is necessary to push the insert down between the walls of the receptacle, causing it to bow slightly in the middle.

When the force is removed, the memory property of the insert causes it to attempt to straighten out, thereby applying sideways force against the receptacle walls sufficient to be held there by the friction. The chopping board insert generally is provided with a thickness of from 1/64" inch to 1/4" inch and is sufficiently flexible and elastic to be bent into an arc of from 60° degrees to 180° degrees and still return to a substantially planar conformation.

The frame of the cutting board of the invention further provides means for supporting a bowl, pot, pan or similar vessel in a substantially horizontal orientation position adjacent to the cutting surface of the chopping portion of the frame. The support means are incorporated into a portion of the frame which may be at a slightly lower elevation than the chopping portion. The support means may comprise a combination of clipping pins in conjunction with outer-rim supporting frame members. Alternatively, the support means may comprise a combination of clipping pins in conjunction with an elastic support harness. Alternative embodiments of these and other alternatives will be described further hereinbelow.

BRIEF DESCRIPTION OF THE DRAWINGS

The following is a detailed description of exemplary embodiments of the present invention, in conjunction with the drawings in which:

FIG. 1 is a top plan view of one exemplary embodiment constructed in accordance with the general principles of the present invention;

FIG. 2 is a bottom plan view of another exemplary embodiment constructed in accordance with the present invention;

FIG. 3 is a cross-sectional view taken along line III—III and looking in the direction indicated by the arrows of the exemplary embodiment shown in FIG. 1;

FIG. 4 is a cross-sectional view taken along line VII—VII and looking in the direction indicated by the arrows of the exemplary embodiment shown in FIG. 1;

FIG. 5 is a left side view of the exemplary embodiment shown in FIG. 1;

FIG. 6 is an elevational view of the front of the exemplary embodiment shown in FIG. 1;

FIG. 7 is an elevational view of the rear of the exemplary embodiment shown in FIG. 1;

FIG. 10 is a bottom plan view of a chopping board constructed in accordance with another exemplary embodiment of the present invention;

FIG. 11 is a cross-sectional view of the exemplary embodiment shown in FIG. 10 taken along line XI—XI and looking in the direction of the arrows;

FIG. 12 is a bottom plan view of a chopping board constructed accordance with another exemplary embodiment of the present invention;

FIG. 13 is a cross-sectional view of the exemplary embodiment shown in FIG. 12 taken along line XIII—XIII and looking in the direction of the arrows;

FIG. 14 is a top-plan view of a chopping board constructed in accordance with another exemplary embodiment of the present invention;

FIG. 15 is a bottom plan view of the exemplary embodiment shown is FIG. 14;

FIG. 16 is a top-plan view of a chopping board constructed in accordance with another exemplary embodiment of the present invention;

FIG. 17 is a bottom plan view of a chopping board constructed in accordance with another exemplary embodiment of the present invention;

FIG. 20 is a top-plan view of a chopping board constructed in accordance with another exemplary embodiment of the present invention;

DETAILED DESCRIPTION OF THE EXEMPLARY EMBODIMENTS

Figure 8:
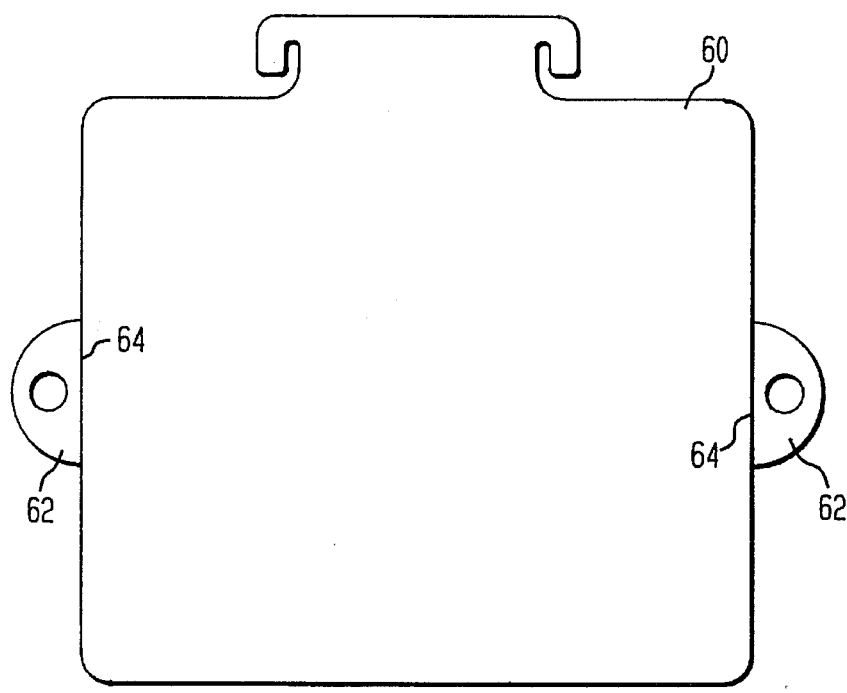
FIG. 8 is a top plan view of an insert for use in conjunction with the exemplary embodiments of the present invention.

Chopping boards for use in food preparation constructed in accordance with the present invention are described hereinbelow. Generally speaking, and with particular reference to the exemplary embodiments depicted in FIGS. 1–9, the chopping board 10 comprises a substantially planar frame 12 including an upper frame surface 14 and a lower frame surface 16. Upper frame surface 14 has rim 15 which surrounds a chopping portion 18 which may be somewhat concave as in the embodiment shown in FIGS. 2 and 3 or substantially planar as will be described further hereinbelow. Rim 15 nearly completely surrounds chopping portion 18 for preventing foods from falling off of surface 18. However, rim 15 is interrupted by mouth 21 which serves to funnel chopped food into a receiving vessel.

As best seen in FIG. 3 chopping portion 18 may be provided with some concavity for two purposes; [a] to catch liquids ejected or emitted from foods being cut and lead the liquids away from mouth 21 and any vessel adjacent thereto, and [b] to allow an insert 60 (FIGS. 8 and 9) described further hereinbelow to be inserted into place and maintained therein by frictional forces caused by the flexure of the insert into the curvature of chopping portion 18. Alternatively, as in FIG. 1, rim 15 could be provided with an inner wall 17 having at least two insert retaining hubs 68 past for releasably maintaining in place an insert 60 pushed down under the edges of nubs 68.

Frame 12 also includes bowl support portion 20 adjacent to mouth 21 for maintaining a food bowl, cooking pot or other receiving vessel in a substantially horizontal orientation adjacent to chopping portion 18. Bowl support portion 20 includes bowl support means 19 which can incorporate a number of possible combinations of features described further hereinbelow which combine to suspend some or all types and sizes of cooking pots, pans, bowls, cups and the like in close proximity to mouth 21 of chopping portion 18 in a "hands-free" manner.

Chopping board 10 has an overall length L' in the range of from 15" to 24" inches and an overall width W' of from 6" to 24" inches. Lower surface 16 includes sink rim positioning means 22 for maintaining frame 12 in a stable position suspended between two opposing rims of a kitchen sink. In the exemplary embodiment, sink rim positioning means 22 comprises stepped ridges 24 and 25 formed in lower surface 16 at or relatively near the opposing edges thereof and located a distance apart from one another of from 14" to as much as 23" inches. Stepped ridge 25 could actually comprise a removable tab thereby allowing a consumer to adjust the distance between ridges 24 and 25 to more closely match the width of the sink in which the cutting board will most often be used.

In a chopping board 10 adapted to maintain many no-handled and most two-handled pots and bowls in a hands-free position, bowl support means 19 includes bowl receptacle portion 26 which is adjacent to chopping portion 18. Bowl support means 19 in the exemplary embodiment depicted in FIGS. 1–7 further includes cooperative rim positioners 28 and 29 located on lower frame surface 16 and outer rim supports 30 located on bowl receptacle portion 26. Some of the other forms which cooperative rim positioners 28 can take are illustrated in FIGS. 10–13 and are denoted by the numerals 128 and 228. This convention of denoting like or similar parts with the same numerals increased by 100, 200, etc. will be observed throughout the remainder detailed description.

Bowl receptacle portion 26 is a nearly circular cutout 27 provided in frame 12 and although lower and greater diameters are feasible if so desired, e.g., larger for commercial applications, or smaller for laboratory work, a diameter in the range of from about 6" inches to 20" inches would satisfy the needs of the majority of users. Cutout 27 is an incomplete circle adjacent to chopping portion 18 which extends from either side of mouth 31 beginning at one outer rim support 30 and ending at the opposite outer rim support 30. Cutout 27 and outer rim supports 30 have their upper surface 32 at an elevation E' which may be in the range of from 1/32" inches to 1" inches lower than lower surface 16 in the immediate area of cooperative rim positioners 28 and 29, as best seen in FIGS. 3 and 4.

As seen in FIGS. 10–13, cooperative upper rim positioners 28 may take the form of rim retaining pins 128, 134, 136 or 228 and 238 which comprise a combination of angled pins arranged in close proximity to one another and near mouth 31. In use, the bowl's rim is inserted into cutout 127 from above bringing the bowl's rim into contact with pins 128, 134, 136 or 228, 238. The bowl's rim is then pushed up between the pins such that pins 134, 136 or 238 is contacting the outer rim of the bowl and pins 128 or 228 are contacting the inner surface of the bowl rim. The bowl is then lowered so that its outer surfaces settle against shoulders 130 or 230. The combination of pressures applied by the bowl against pins 128, 134, 136 or 228, 238 and shoulders 130 or 230 are sufficient in most cases to maintain the bowl in a substantially upright or nearly horizontal orientation adjacent to cutting surface as required by the present invention.

With reference now to FIGS. 2 and 14–20, alternate embodiments of chopping boards 110, 310, 410 and 510 are provided with cooperative means for supporting or suspending a bowl or pot in a substantially horizontal orientation in parallel relationship with cutting surface 18. In these alternate embodiments, the support means comprise at least one upper rim retainer 28, 328, 428, 528 located on lower frame surface 16 adjacent to mouth 31 in cooperation with lower bowl suspension means 46, 346, 446 or 546. The bowl suspension means 46, 346, 446 or 546 comprises at least one elastic member 48, 48, 448 or 548 positioned across bowl receptacle portion 26.

With particular reference to FIGS. 14 and 15, it can be seen that a single elastic member 348 is stretched across cutout 27 between outer rim supports 30 and underneath mouth 31. Elastic member 348 is held at both ends by retaining clip 350 formed in or through upper surface 32 on outer rim supports 30 of bowl receptacle portion 26.

Figure 19:
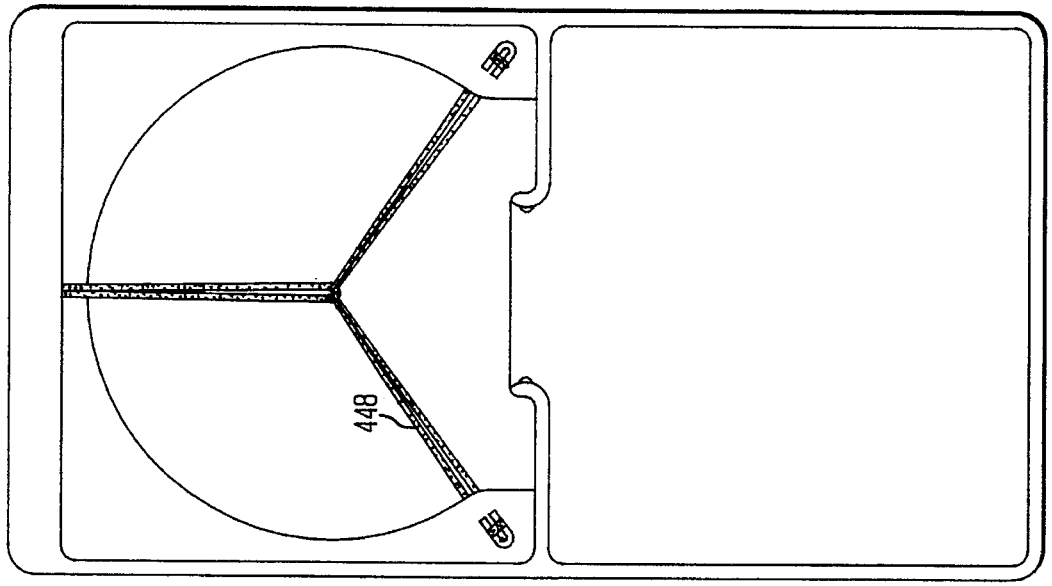
FIG. 19 is a top-plan view of a chopping board constructed in accordance with another exemplary embodiment of the present invention.
Figure 18:
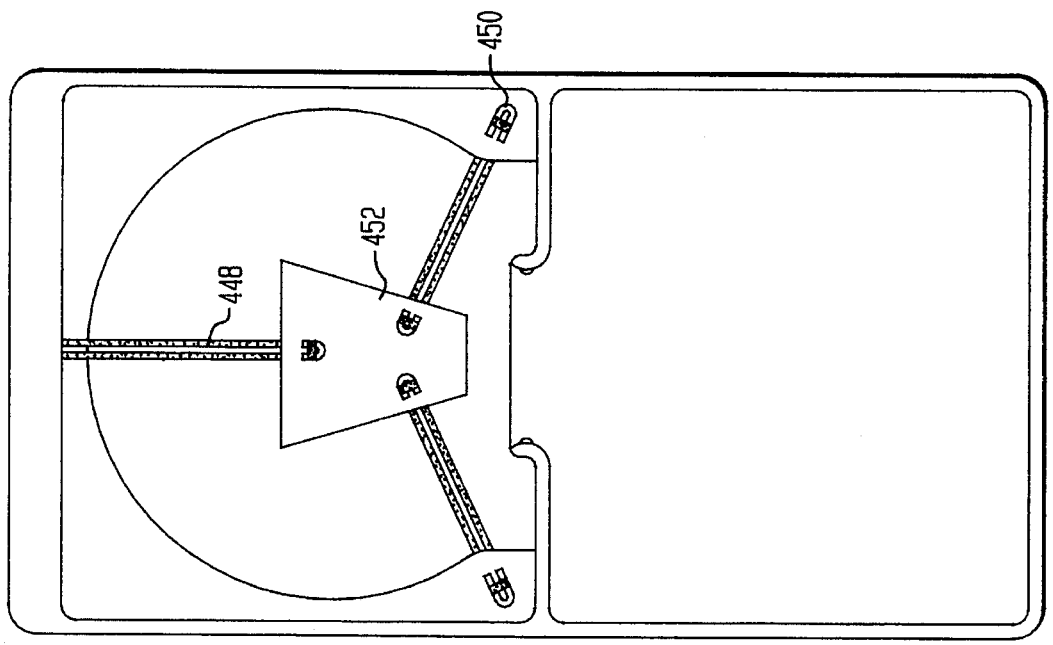
FIG. 18 is a top-plan view of a chopping board constructed in accordance with another exemplary embodiment of the present invention.

With particular reference to FIG. 2, it can be seen that a plurality of elastic members 48 pass through or are attached to a bridging member 52 which is suspended in bowl receptacle portion 26 thereby. The embodiments of FIGS. 2, 16 and 17 illustrate the use of three elastics, however as seen in FIG. 18, the invention can be practiced with fewer than three elastic members, and though not show, more than three could be used. In the embodiments shown in FIGS. 16–18, bridging member 452 is in the shape of a triangle, circle or trapezoid, however these are merely examples and other shapes may be more or less suitable for different applications. Elastic members 448 are each wrapped over retaining tab or clip 450, passed through bridging member 452, and wrapped again around retaining tab 450. Alternatively, as seen in FIG. 2, bridging member 52 could be provided with hooks or eyelets similar to clips 50, 350 and 450 around which an elastic can be hooked. With reference to FIG. 19, it can be seen that the invention can be practiced without any bridging member 52, 452 and simply by tying together the elastic members 448.

All of the embodiments depicted in FIGS. 14–19 are used by either first positioning the bowl's rim against upper rim retainer 328, 428, 528 and then resting the outer surface of the bowl either against elastic member 348 or on top of bridging members 452 or in the reverse order. In the case of the embodiment using a single elastic member 348 (which could be used with a bridging member or without), the user could actually position elastic member 348 across the bottom of the bowl being suspended or simply allow member 348 to exert pressure against the outer side surface of the bowl. The preferable arrangement of the elastic members 48, 348, 448 and bridging members 52, 452 should take into consideration that substantially upwardly vertical force or force with at least a substantial vertical vector directed upward against the bottom of the bowl or pot being suspended is desired. Furthermore, the force should be such that the lip or rim of the bowl is pressed upward against rim positioners 28 on lower surface 16.

Figure 9:
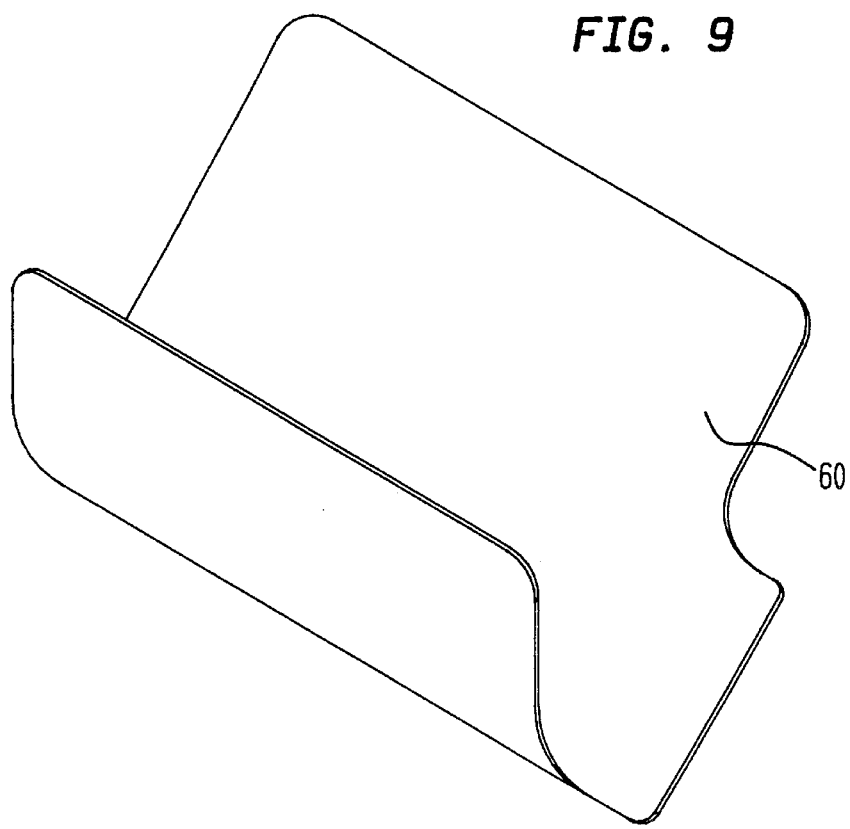
FIG. 9 is a perspective view of another exemplary embodiment of an insert for use in conjunction with the exemplary embodiments of the present invention.
Figure 21:
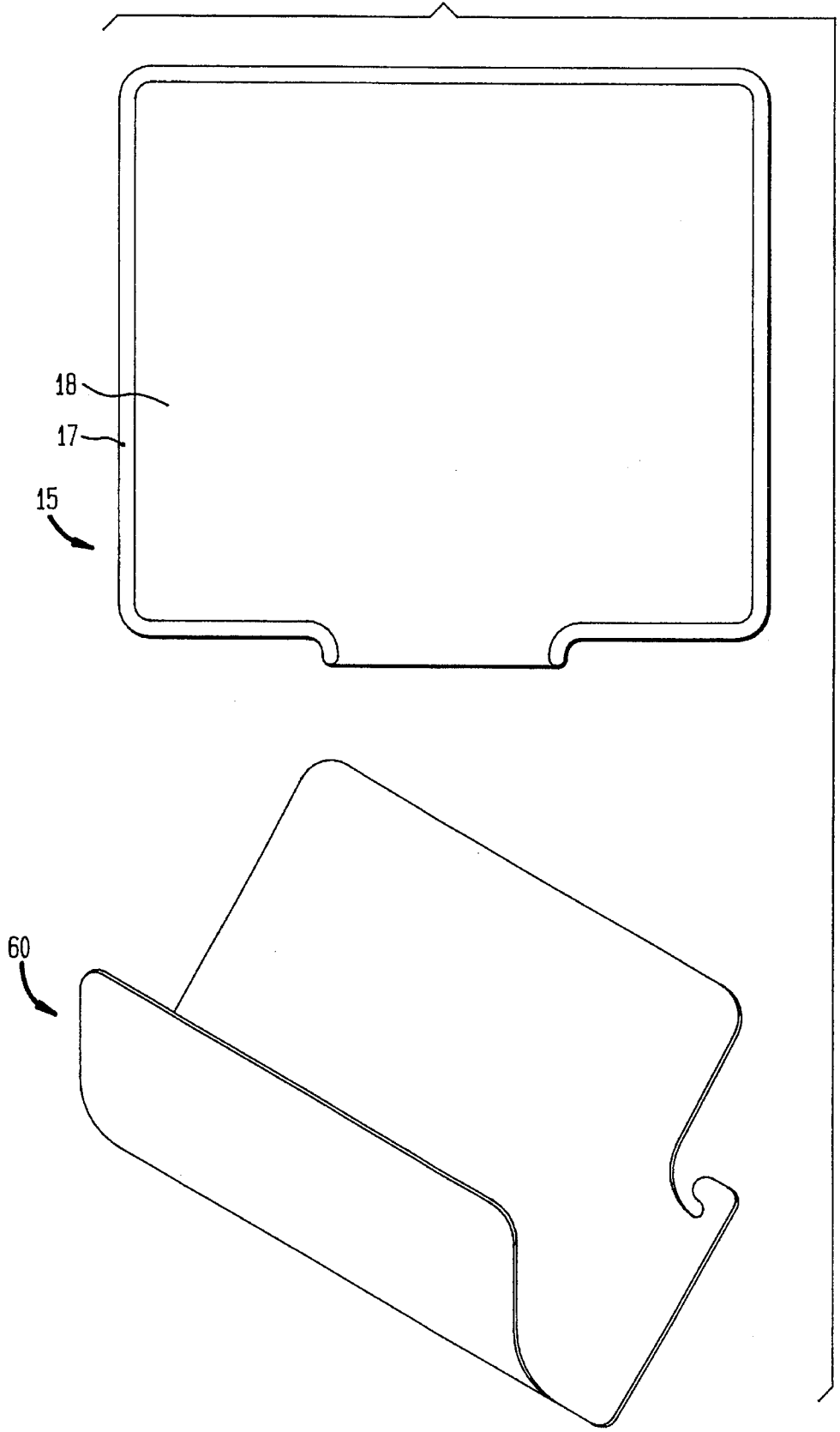
FIG. 21 is an exploded view, in partial perspective, of a chopping board and insert constructed in accordance with another exemplary embodiment of the present invention.

With reference to FIGS. 8, 9 and 21, there is shown an insert 60 which may be used with any of the embodiments of cutting board described herein. Where chopping portion 18 is substantially planar, insert 60 is sized and shaped in substantial conformance with chopping portion 18 such that it fits snugly into place between the walls 17 of rim 15. A user would thus push insert 60 down onto chopping portion 18 until the edges of insert 60 are pushed beyond and under insert retaining nubs 68. Where chopping portion 18 has some concavity, the insert 60 is sized with its width being slightly larger than the width between at least two opposing walls 17 of rim 15, thereby requiring a user to bend the insert 60 in order to fully seat it into chopping portion 18. The concavity of chopping portion 18 and resultant bending of insert 60 causes insert 60 to be retained in place until it is snapped out therefrom by the user. For this reason, insert 60 as shown in FIG. 8 is provided with gripping loops 62 which are hingedly attached to the sides of insert 60 by any known type of hinge including either a true hinge or by a living hinge 64 as shown. This allows a user to pull an insert 60 laden with chopped food away from frame 12 and bending it as shown in FIG. 9 to scoop the food into another remote vessel with a minimized risk of losing the food.

Insert 60 therefore requires sufficient flexibility to be easily snapped into and out of place between side walls 17 as well as having sufficient flexibility to be bent into a scoop or funnel shape to allow easy pouring of chopped contents into other vessels. As an example, an insert 60 can be inexpensively made of polyethylene, having a thickness of from 1/64" inches to as much as 1 inch, with the thickness preferably being from about 1/64" inch to about 1/4" inch. At these thicknesses, a polyethylene insert 60 should last as long as the average nylon chopping board, if used on both sides, at a cost as low as 1/10 that of a nylon board. Additionally, the insert 60 will have the added utility of being used to easily move chopped food to its final destination and with reduced possibility of spillage. The amount of flexibility and elasticity of an insert 60 which may be used as a scoop or funnel should be such that it may be bent into an arc of from at least 60° degrees to about 270° degrees.

FIG. 20 shows an embodiment of the invention wherein the frame 12 of the cutting board is interrupted at the side 66 farthest away from mouth 31. This provides frame 12 with frame extensions 70 which are angled towards one another. Due to the flexibility imparted to polypropylene and the other plastics from which it is foreseen the invention will most often be fabricated, extensions 70 can self-adjust somewhat to the weight and size of heavily laden vessels although it will allow certain smaller diameter vessels to be more easily accommodated, with or without an elastic member 148 as shown.

FIG. 21 further shows an embodiment of the invention wherein a cutting board 10 comprises a frame 12 which has no bowl support means as seen in earlier embodiments. Frame 12 provides a slightly concave chopping portion 18 surrounded by rim 15. Therefore, where one does not seek to offer the consumer the convenience of "hands-free" food chopping and cutting, a somewhat simpler and perhaps less expensive version still provides a cutting board which is cleaner, more hygienic and which allows easy movement of cut foods to remote cooking vessels.

Figure 22:
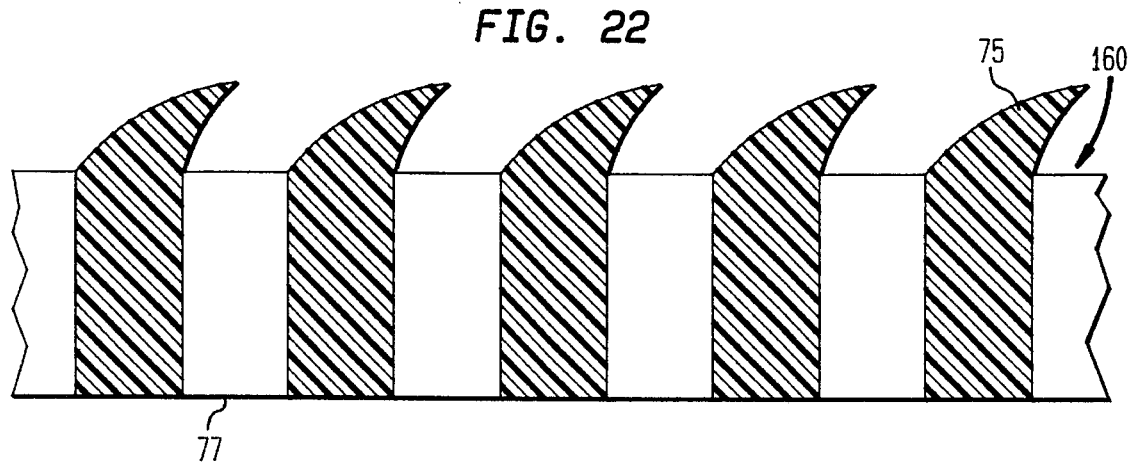
FIG. 22 is a cross-sectional view in detail of a portion of a chopping board insert constructed in accordance with another exemplary embodiment of the present invention.
Figure 23:
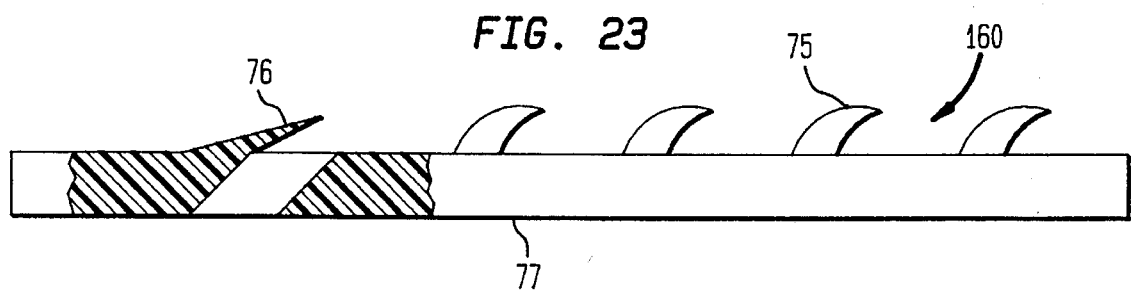
FIG. 23 is a partial cross-sectional view in detail of another chopping board insert constructed in accordance with another exemplary embodiment of the present invention.

A further advantage to using an insert 60 is seen in FIGS. 22 and 23 wherein it is shown that insert 160 may be provided on one side with a grating surface 75 and it may further be provided with a slicing surface 76. These modifications allow a user to chop vegetables on the flat side 77 of the insert 160, pushing the vegetables into the suspended bowl or pot after each stroke thereby giving the cook an effectively larger chopping area. The user then can turn over the insert 160, position insert 160 over the suspended pot or bowl, and grate or slice food directly into the bowl without stopping to search for a separate grating or slicing device and thereby reducing the number of utensils which must be washed. Alternatively, insert 160 could be hingedly received onto chopping surface 118, for example by being ball and socket hinged into side wall 17 at mouth 31 such that a user merely needs to rotate the insert 160 around the hinge to lift the grater into position over the suspended bowl.

All of the embodiments using elastic members can be modified so that numerous forms of clips or retaining tabs could be successfully utilized to maintain the elastic members in place. It will be understood that the embodiments described herein are merely exemplary and that a person skilled in the art may make many variations and modifications without departing from the scope and spirit of the invention. All such modifications and variations are intended to be included within the scope of the invention as defined in the appended claims.

I claim:

1. A chopping board for food preparation, cutting and chopping, said chopping board comprising a substantially planar frame, said frame surrounding a chopping portion at a first elevation having a first upper surface and first lower surface and a bowl receptacle portion at a second elevation lower than said first elevation having a second upper surface and a second lower surface, said first and second upper surfaces being separated from one another by a determined vertical distance, said chopping board further comprising cooperative bowl support means for maintaining the rim of a bowl or pot in a substantially horizontal orientation adjacent to and below said chopping portion, said cooperative bowl support means including at least one of a first cooperative member on said first lower surface and at least one of a second cooperative member located on said second upper surface.

2. A chopping board in accordance with claim 1, wherein said lower surface of said frame includes sink rim positioning means for maintaining said frame in a stable position suspended between two opposing rims of the sink.

3. A chopping board in accordance with claim 1, wherein said first cooperative member comprises an upper rim retainer depending from said first lower surface at a location adjacent to said bowl receptacle.

4. A chopping board in accordance with claim 1, wherein said second cooperative member comprises lower bowl suspension means for supporting a bowl or pot in a suspended position contacting the outer surface of the bowl or pot.

5. A chopping board in accordance with claim 4, wherein said lower bowl suspension means comprises at least one elastic band positioned across said bowl receptacle at a location adjacent to said chopping portion and located at said second elevation.

6. A chopping board in accordance with claim 4, wherein said lower bowl suspension means comprises the combination of at least one bridging member suspended across said bowl receptacle by at least one elastic band.

7. A chopping board in accordance with claim 1, wherein said chopping portion includes a substantially planar surface receptacle for receiving chopping board inserts, said inserts having a depth and peripheral conformation complementary to said surface receptacle.

8. A chopping board in accordance with claim 1, wherein said chopping portion includes a slightly concave surface receptacle for receiving chopping board inserts, said inserts having a depth similar to said receptacle and peripheral conformation complementary to said surface receptacle and sufficiently large enough and flexible enough to provide a friction fit when inserted into said surface receptacle.

9. The combination of a chopping board in accordance with claim 1, wherein said chopping board insert is sufficiently flexible and elastic to be bent into an arc of from 60° degrees to 180° degrees and still return to a substantially planar conformation.

10. The combination of a chopping board in accordance with claim 8, wherein said chopping board insert is sufficiently flexible and elastic to be bent into an arc of from 60° degrees to 180° degrees and still return to a substantially planar conformation.

* * * * *